United States Patent
Arroyo et al.

(10) Patent No.: US 10,761,949 B2
(45) Date of Patent: *Sep. 1, 2020

(54) LIVE PARTITION MOBILITY WITH I/O MIGRATION

(71) Applicant: International Business Machines Corporation, Armonk, NY (US)

(72) Inventors: Jesse P. Arroyo, Rochester, MN (US); Charles S. Graham, Rochester, MN (US); Prathima Kommineni, Hyderabad (IN); Timothy J. Schimke, Stewartville, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/007,134

(22) Filed: Jun. 13, 2018

(65) Prior Publication Data

US 2018/0293140 A1 Oct. 11, 2018

Related U.S. Application Data

(63) Continuation of application No. 15/049,506, filed on Feb. 22, 2016, now Pat. No. 10,042,720.

(51) Int. Cl.
*G06F 11/14* (2006.01)
*G06F 9/455* (2018.01)
*G06F 11/20* (2006.01)

(52) U.S. Cl.
CPC ...... *G06F 11/1484* (2013.01); *G06F 9/45558* (2013.01); *G06F 11/1451* (2013.01);
(Continued)

(58) Field of Classification Search
CPC ............. G06F 11/1464; G06F 11/1451; G06F 11/1484; G06F 11/203; G06F 9/45558; G06F 2009/4557
See application file for complete search history.

(56) References Cited

U.S. PATENT DOCUMENTS 7,039,692 B2  5/2006  Foster et al.
7,209,994 B1  4/2007  Klaiber et al.
(Continued)

FOREIGN PATENT DOCUMENTS

CN  101488092 A  7/2009
CN  104737138 A  6/2015
(Continued)

OTHER PUBLICATIONS

Ajila et al., *Efficient Live Wide Area VM Migration With IP Address Change Using Type II Hypervisor*, 2013 IEEE 14th International Conference on Information Reuse and Integration (IRI2013), Aug. 2013, pp. 372-379, IEEE Xplore Digital Library (online), DOI: 10.1109/IRI.2013.6642495.
(Continued)

*Primary Examiner* — Paul Contino
(74) *Attorney, Agent, or Firm* — Peter J. Edwards

(57) ABSTRACT

Live partition mobility in a computing environment that includes a source system and a target system may be carried out by: pausing a logical partition on the source system, wherein the logical partition is mapped to an I/O adapter of the source system; copying, to the target system, configuration information describing the mapping of the logical partition to the I/O adapter; copying, to the target system, the logical partition of the source system; placing an I/O adapter of the target system into an error state; mapping, in dependence upon the configuration information, the logical partition of the target system to the I/O adapter of the target system; placing the I/O adapter of the target system into an
(Continued)

error recovery state; and resuming the logical partition on the target system.

17 Claims, 6 Drawing Sheets

(52) U.S. Cl.
CPC ........ *G06F 11/1464* (2013.01); *G06F 11/203* (2013.01); *G06F 2009/4557* (2013.01)

(56) References Cited

U.S. PATENT DOCUMENTS

| | | | |
|---|---|---|---|
| 7,240,364 B1 | 7/2007 | Branscomb et al. | |
| 7,549,090 B2* | 6/2009 | Bailey | G06F 11/0712 370/216 |
| 7,574,537 B2 | 8/2009 | Arndt et al. | |
| 7,613,898 B2 | 11/2009 | Haertel et al. | |
| 7,734,843 B2 | 6/2010 | Bender et al. | |
| 7,813,366 B2 | 10/2010 | Freimuth et al. | |
| 7,882,326 B2 | 2/2011 | Armstrong et al. | |
| 7,937,518 B2 | 5/2011 | Boyd et al. | |
| 7,984,262 B2 | 7/2011 | Battista et al. | |
| 8,146,082 B2* | 3/2012 | Belay | G06F 9/45558 711/6 |
| 8,219,988 B2 | 7/2012 | Armstrong et al. | |
| 8,321,722 B2 | 11/2012 | Tanaka et al. | |
| 8,327,086 B2 | 12/2012 | Jacobs et al. | |
| 8,418,166 B2 | 4/2013 | Armstrong et al. | |
| 8,429,446 B2 | 4/2013 | Hara et al. | |
| 8,533,713 B2 | 9/2013 | Dong | |
| 8,561,065 B2 | 10/2013 | Cunningham et al. | |
| 8,561,066 B2 | 10/2013 | Koch et al. | |
| 8,607,230 B2 | 12/2013 | Hatta et al. | |
| 8,621,120 B2 | 12/2013 | Bender et al. | |
| 8,645,755 B2* | 2/2014 | Brownlow | G06F 11/0712 710/104 |
| 8,677,356 B2 | 3/2014 | Jacobs et al. | |
| 8,683,109 B2 | 3/2014 | Nakayama et al. | |
| 8,874,749 B1 | 10/2014 | Vittal et al. | |
| 8,875,124 B2 | 10/2014 | Kuzmack et al. | |
| 8,984,240 B2 | 3/2015 | Aslot et al. | |
| 9,032,122 B2 | 5/2015 | Hart et al. | |
| 9,047,113 B2 | 6/2015 | Iwamatsu et al. | |
| 9,304,849 B2 | 4/2016 | Arroyo et al. | |
| 9,317,317 B2 | 4/2016 | Graham et al. | |
| 9,473,400 B1 | 10/2016 | DeVilbiss et al. | |
| 9,501,308 B2 | 11/2016 | Arroyo et al. | |
| 9,552,233 B1 | 1/2017 | Tsirkin et al. | |
| 9,715,469 B1* | 7/2017 | Arroyo | G06F 13/24 |
| 9,720,862 B1* | 8/2017 | Arroyo | G06F 13/24 |
| 9,720,863 B1* | 8/2017 | Arroyo | G06F 13/385 |
| 9,740,647 B1* | 8/2017 | Arroyo | G06F 13/28 |
| 9,760,512 B1* | 9/2017 | Arroyo | G06F 13/28 |
| 9,785,451 B1 | 10/2017 | Arroyo et al. | |
| 9,830,171 B1* | 11/2017 | Arroyo | G06F 9/45558 |
| 9,875,060 B1* | 1/2018 | Arroyo | G06F 13/385 |
| 9,892,070 B1* | 2/2018 | Arroyo | G06F 13/24 |
| 9,916,267 B1* | 3/2018 | Arroyo | G06F 13/24 |
| 9,940,123 B1 | 4/2018 | Ayoub et al. | |
| 10,002,018 B2 | 6/2018 | Anand et al. | |
| 10,025,584 B2 | 7/2018 | Anand et al. | |
| 10,042,720 B2 | 8/2018 | Arroyo et al. | |
| 10,042,723 B2* | 8/2018 | Arroyo | G06F 11/2002 |
| 10,209,918 B2* | 2/2019 | Arroyo | G06F 13/385 |
| 10,417,150 B2* | 9/2019 | Arroyo | G06F 13/385 |
| 2002/0083258 A1 | 6/2002 | Bauman et al. | |
| 2003/0050990 A1 | 3/2003 | Craddock et al. | |
| 2003/0101377 A1 | 5/2003 | Dawkins et al. | |
| 2003/0204648 A1 | 10/2003 | Arndt | |
| 2004/0064601 A1 | 4/2004 | Swanberg | |
| 2004/0205272 A1 | 10/2004 | Armstrong et al. | |
| 2004/0243994 A1 | 12/2004 | Nasu | |
| 2006/0095624 A1 | 5/2006 | Raj et al. | |
| 2006/0179177 A1 | 8/2006 | Arndt et al. | |
| 2006/0195618 A1 | 8/2006 | Arndt et al. | |
| 2006/0195620 A1 | 8/2006 | Arndt et al. | |
| 2006/0281630 A1 | 12/2006 | Bailey et al. | |
| 2007/0157197 A1 | 7/2007 | Neiger et al. | |
| 2007/0260768 A1 | 11/2007 | Bender et al. | |
| 2008/0005383 A1 | 1/2008 | Bender et al. | |
| 2008/0114916 A1 | 5/2008 | Hummel et al. | |
| 2008/0147887 A1 | 6/2008 | Freimuth et al. | |
| 2009/0007121 A1 | 1/2009 | Yamada et al. | |
| 2009/0037941 A1 | 2/2009 | Armstrong et al. | |
| 2009/0083467 A1 | 3/2009 | Giles et al. | |
| 2009/0119538 A1 | 5/2009 | Scales et al. | |
| 2009/0133016 A1 | 5/2009 | Brown et al. | |
| 2009/0133028 A1 | 5/2009 | Brown et al. | |
| 2009/0249366 A1 | 10/2009 | Sen et al. | |
| 2009/0276551 A1 | 11/2009 | Brown et al. | |
| 2009/0276773 A1* | 11/2009 | Brown | G06F 9/45558 718/1 |
| 2010/0036995 A1 | 2/2010 | Nakayama et al. | |
| 2010/0250824 A1 | 9/2010 | Belay | |
| 2010/0262727 A1 | 10/2010 | Arndt | |
| 2010/0299666 A1 | 11/2010 | Agbaria et al. | |
| 2011/0197003 A1 | 8/2011 | Serebrin et al. | |
| 2011/0289345 A1 | 11/2011 | Agesen et al. | |
| 2011/0314345 A1 | 12/2011 | Stern et al. | |
| 2011/0320860 A1 | 12/2011 | Coneski et al. | |
| 2012/0042034 A1* | 2/2012 | Goggin | G06F 9/4856 709/216 |
| 2012/0089864 A1* | 4/2012 | Tanaka | G06F 11/201 714/5.1 |
| 2012/0131232 A1 | 5/2012 | Brownlow et al. | |
| 2012/0131576 A1 | 5/2012 | Hatta et al. | |
| 2012/0137288 A1 | 5/2012 | Barrett et al. | |
| 2012/0137292 A1 | 5/2012 | Iwamatsu et al. | |
| 2012/0151473 A1 | 6/2012 | Koch et al. | |
| 2012/0159245 A1* | 6/2012 | Brownlow | G06F 11/0712 714/23 |
| 2012/0167082 A1 | 6/2012 | Kumar et al. | |
| 2012/0179932 A1 | 7/2012 | Armstrong et al. | |
| 2012/0191935 A1 | 7/2012 | Oberly, III et al. | |
| 2012/0198187 A1 | 8/2012 | Accapadi et al. | |
| 2012/0246644 A1 | 9/2012 | Hattori et al. | |
| 2012/0265910 A1 | 10/2012 | Galles et al. | |
| 2012/0297379 A1 | 11/2012 | Anderson et al. | |
| 2012/0303594 A1 | 11/2012 | Mewhinney et al. | |
| 2013/0086298 A1 | 4/2013 | Alanis et al. | |
| 2013/0159572 A1* | 6/2013 | Graham | G06F 13/387 710/104 |
| 2013/0159686 A1* | 6/2013 | Graham | G06F 9/5077 713/1 |
| 2013/0160001 A1* | 6/2013 | Graham | G06F 9/45558 718/1 |
| 2013/0160002 A1 | 6/2013 | Graham et al. | |
| 2013/0191821 A1 | 7/2013 | Armstrong et al. | |
| 2013/0268800 A1 | 10/2013 | Rangaiah | |
| 2014/0122760 A1 | 5/2014 | Grisenthwaite et al. | |
| 2014/0149985 A1 | 5/2014 | Takeuchi | |
| 2014/0181801 A1 | 6/2014 | Voronkov et al. | |
| 2014/0229769 A1 | 8/2014 | Abraham et al. | |
| 2014/0245296 A1 | 8/2014 | Sethuramalingam et al. | |
| 2014/0258570 A1 | 9/2014 | Eide et al. | |
| 2014/0281263 A1 | 9/2014 | Deming et al. | |
| 2014/0351471 A1 | 11/2014 | Jebson et al. | |
| 2014/0372739 A1 | 12/2014 | Arroyo et al. | |
| 2014/0372789 A1 | 12/2014 | Arroyo et al. | |
| 2014/0372795 A1 | 12/2014 | Graham et al. | |
| 2014/0372801 A1 | 12/2014 | Graham et al. | |
| 2015/0006846 A1 | 1/2015 | Youngworth | |
| 2015/0052281 A1 | 2/2015 | Hart et al. | |
| 2015/0052282 A1 | 2/2015 | Dong | |
| 2015/0120969 A1 | 4/2015 | He et al. | |
| 2015/0193248 A1 | 7/2015 | Noel et al. | |
| 2015/0193250 A1 | 7/2015 | Ito et al. | |
| 2015/0220354 A1* | 8/2015 | Nair | G06F 13/28 710/301 |
| 2015/0229524 A1 | 8/2015 | Engebretsen et al. | |
| 2015/0301844 A1 | 10/2015 | Droux et al. | |
| 2015/0317274 A1 | 11/2015 | Arroyo et al. | |

(56) References Cited

U.S. PATENT DOCUMENTS

| | | | |
|---|---|---|---|
| 2015/0317275 A1 | 11/2015 | Arroyo et al. | |
| 2016/0019078 A1 | 1/2016 | Challa et al. | |
| 2016/0077884 A1* | 3/2016 | Hunter | G06F 9/5077 718/104 |
| 2016/0170855 A1* | 6/2016 | Graham | G06F 11/1415 714/5.11 |
| 2016/0239326 A1* | 8/2016 | Kaplan | G06F 9/4881 |
| 2016/0246540 A1 | 8/2016 | Blagodurov et al. | |
| 2016/0350097 A1 | 12/2016 | Mahapatra et al. | |
| 2017/0046184 A1 | 2/2017 | Tsirkin et al. | |
| 2017/0075706 A1* | 3/2017 | Apfelbaum | G06F 9/45558 |
| 2017/0199768 A1 | 7/2017 | Arroyo et al. | |
| 2017/0242720 A1* | 8/2017 | Anand | G06F 9/45558 |
| 2017/0242756 A1 | 8/2017 | Arroyo et al. | |
| 2017/0242763 A1* | 8/2017 | Arroyo | G06F 11/2002 |
| 2017/0249136 A1 | 8/2017 | Anand et al. | |
| 2018/0113644 A1* | 4/2018 | Arroyo | G06F 13/385 |
| 2018/0113823 A1 | 4/2018 | Arroyo et al. | |
| 2018/0285096 A1 | 10/2018 | Anand et al. | |
| 2018/0293143 A1* | 10/2018 | Arroyo | G06F 11/2002 |
| 2019/0317820 A1* | 10/2019 | Abdulla | G06F 9/5088 |
| 2019/0361751 A1* | 11/2019 | Chen | G06F 9/5077 |

FOREIGN PATENT DOCUMENTS

| | | |
|---|---|---|
| JP | 2012-113660 A | 6/2012 |
| JP | 5001818 B | 8/2012 |

OTHER PUBLICATIONS

PCI-SIG, *Single Root I/O Virtualization and Sharing Specification-Revision 1.0*, Sep. 2007, PCI-SIG Specifications Library, pcisig.com (online), URL: pcisig.com/specifications/iov/single_root/.

Axnix et al., *IBM z13 firmware innovations for simultaneous multithreading and I/O virtualization*, IBM Journal of Research and Development, Jul./Sep. 2015, vol. 59, No. 4/5, 11-1, International Business Machines Corporation (IBM), Armonk, NY.

Xu et al., *Multi-Root I/O Virtualization Based Redundant Systems*, 2014 Joint 7th International Conference on Soft Computing and Intelligent Systems (SCIS) and 15th International Symposium on Advanced Intelligent Systems (ISIS), Dec. 2014, pp. 1302-1305, IEEE Xplore Digital Library (online), DOI: 10.1109/SCIS-ISIS.2014.7044652.

Xu et al., *SRVM: Hypervisor Support for Live Migration with Passthrough SR-IOV Network Devices*, Proceedings of the 12th ACM SIGPLAN/SIGOPS International Conference on Virtual Execution Environments (VEE'16), Apr. 2016, pp. 65-77, ACM New York, NY, USA.

Huang et al., *Nomad: Migrating OS-bypass Networks in Virtual Machines*, Proceedings Of The 3rd International Conference On Virtual Execution Environments (VEE'07), Jun. 2007, pp. 158-168, ACM New York, NY, USA.

Oracle, *Updating the Universal HBA Firmware*, Oracle Docs, dated Sep. 15, 2013, docs.oracle.com/cd/E24650_01/html/E24461/z40004591045586.html. Accessed Oct. 23, 2017, 4 pages.

Lynch, *Live Partition Mobility*, Presentation, Nov. 11, 2014, 30 pages, FORSYTHE (online), <http://www.circle4.com/forsythe/lpm2014.pdf>.

U.S. Appl. No. 16/001,089, to Manu Anand et al., entitled, *Firmware Management Of SR-IOV Adapters*, assigned to International Business Machines Corporation, 30 pages, filed Jun. 6, 2018.

U.S. Appl. No. 16/005,032, to Jesse P. Arroyo et al., entitled, *Failover Of A Virtual Function Exposed By An SR-IOV Adapter*, assigned to International Business Machines Corporation, 27 pages, filed Jun. 11, 2018.

Appendix P; List of IBM Patent or Applications Treated as Related, Sep. 26, 2018, 2 pages.

Challa, "Hardware Based I/O Virtualization Technologies For Hypervisors, Configurations And Advantages—A Study", 2012 IEEE International Conference on Cloud Computing in Emerging Markets (CCEM), Oct. 2012, pp. 99-103, IEEE Xplore Digital Library (online), DOI: 10.1109/CCEM.2012.6354610.

Salapura et al., "Resilient cloud computing", IBM Journal of Research and Development, Sep./Oct. 2013, vol. 57, No. 5, 10-1, 12 pages, International Business Machines Corporation (IBM), Armonk, NY.

Anonymous, *Virtual Function Tracing in Particular SR-IOV Environment*, The IP.com Prior Art Database (online), Nov. 2015, 13 pages, IP.com Disclosure No. IPCOM000244289D.

\* cited by examiner

LIVE PARTITION MOBILITY WITH I/O MIGRATION

CROSS-REFERENCE TO RELATED APPLICATION

This application is a continuation application of and claims priority from U.S. patent application Ser. No. 15/049,506, filed on Feb. 22, 2016.

BACKGROUND

Field of the Invention

The field of the invention is data processing, or, more specifically, methods, apparatus, and products for live partition mobility with I/O migration.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of advancement includes data centers providing cloud services with various types of virtualization services. Regardless of the particular type of virtualization service being offered, most virtualization services make use of massive amounts of data I/O traffic and network bandwidth. In such a computing environment, live partition mobility in which a logical partition executing on a first host is migrated, without reboot, to a second host, is difficult to perform while maintaining the I/O and network connections of the logical partition executing on the first host.

SUMMARY

Methods, apparatus, and products for live partition mobility in a computing environment are disclosed in this specification. Such a computing environment includes a source system and a target system. Live partition mobility may include: pausing a logical partition on the source system, wherein the logical partition is mapped to an I/O ('input/output') adapter of the source system; copying, to the target system, configuration information describing the mapping of the logical partition to the I/O adapter; copying, to the target system, the logical partition of the source system; placing an I/O adapter of the target system into an error state; mapping, in dependence upon the configuration information, the logical partition of the target system to the I/O adapter of the target system; placing the I/O adapter of the target system into an error recovery state; and resuming the logical partition on the target system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
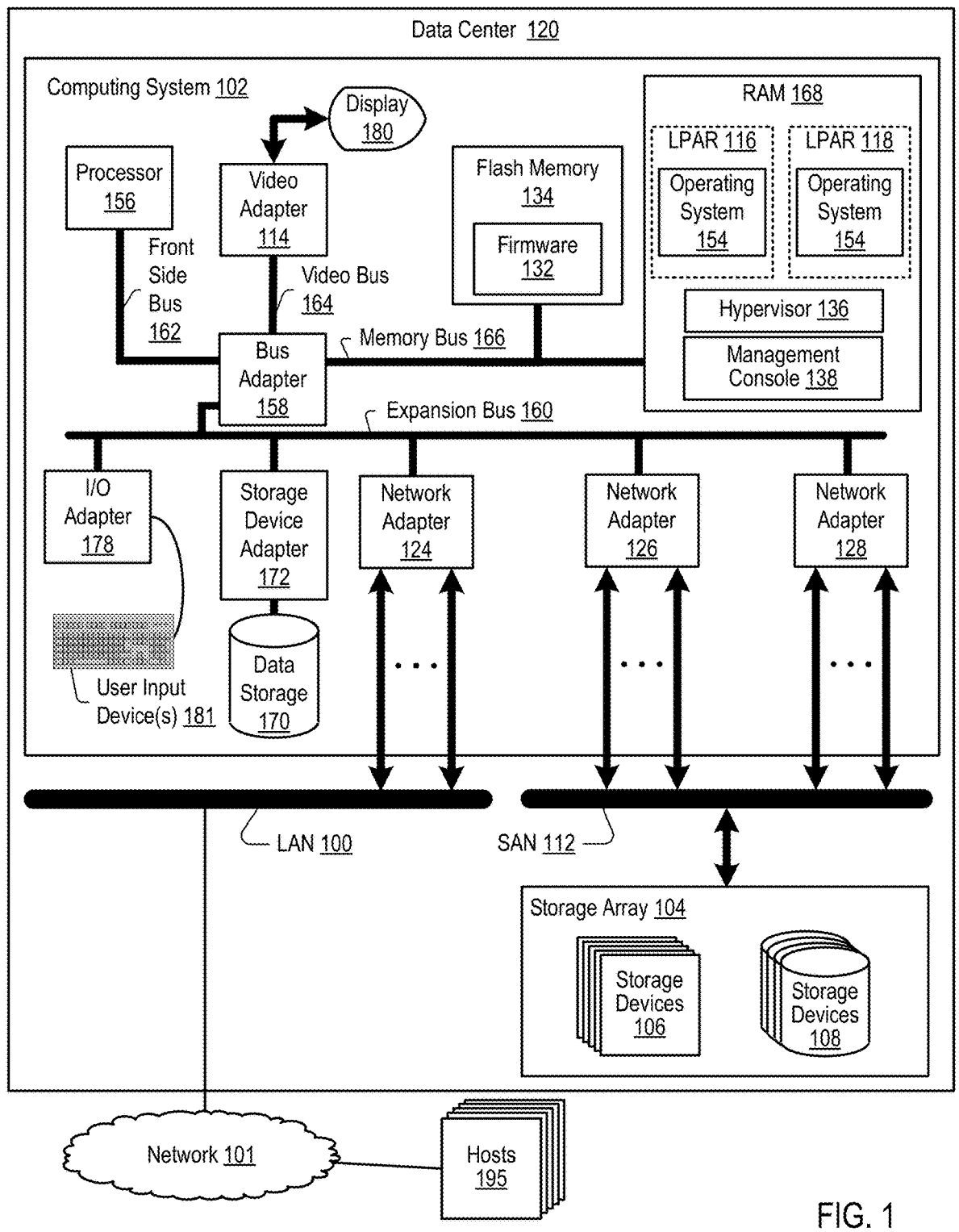
FIG. 1 sets forth an example computing environment configured for live partition mobility.

Embodiments of methods, apparatus, and computer program products for live partition mobility with I/O migration are described with reference to the accompanying drawings, beginning with FIG. 1. FIG. 1 sets forth an example computing environment configured for live partition mobility. The example environment of FIG. 1 includes a data center (120). Such a data center may provide clients on host devices (195) with virtualization services for enabling various cloud related product offerings.

The example data center (120) of FIG. 1 includes automated computing machinery in the form of a computing system (102) configured for live partition mobility with physical I/O migration. Live partition mobility enables a running logical partition to be relocated from one system to another. The source and target systems generally must have access to the same data communications network and storage area network, but need not be of the same type. Partitions that are to be relocated, at least in prior art, must be fully virtualized (that is, have no dedicated physical I/O adapters).

Any sized partition can be moved. Essentially, memory is copied asynchronously from one system to another to create a clone of a running partition, with "dirty" memory pages being re-copied as necessary. When a threshold is reached (such as when a high percentage of the pages have been successfully copied across), the logical partition is transitioned to the target machine and any remaining pages are copied across synchronously. Live partition mobility may be used to avoid outages for planned server maintenance, for load balancing across multiple servers, for energy conservation, and the like.

As mentioned above, in prior art computing environments, live partition mobility is restricted to migration of I/O functionality only with respect to completely virtualized I/O. That is, in prior art computing environments, an I/O communications channel between a logical partition and a physical I/O adapter, such as a PCI or PCIe adapter, cannot be migrated with live partition mobility. As explained below in greater detail, the example computing environment of FIG.

1, by contrast, enables such physical I/O to be migrated during live partition mobility.

The computing system (102) includes at least one computer processor (156) or "CPU" as well as random access memory (168) or "RAM," which is connected through a high speed memory bus (166) and bus adapter (158) to processor (156) and to other components of the computing system (102).

Stored in RAM (168) is a hypervisor (136) and a management console (138). The management console (138) may provide a user interface through which a user may direct the hypervisor (136) on instantiating and maintaining multiple logical partitions (116, 118), where each logical partition may provide virtualization services to one or more clients. Although depicted in the example of FIG. 1 as being stored in RAM (168) of the computer (102), readers will understand the management console (138) may be implemented in a system entirely separate from the computer (102).

Also stored in RAM (168) are two instances of an operating system (154), one for each logical partition (116, 118). Operating systems useful in computers configured for live partition mobility with physical I/O migration according to various embodiments include UNIX™, Linux™, Microsoft Windows™, AIX™, IBM's i™ operating system, and others as will occur to those of skill in the art. The operating systems (154), hypervisor (136), and management console (138) are shown in RAM (168), but many components of such software may typically be stored in non-volatile memory such as, for example, on a data storage (170) device or in firmware (132).

The computing system (102) may also include a storage device adapter (172) coupled through expansion bus (160) and bus adapter (158) to processor (156) and other components of the computing system (102). Storage device adapter (172) connects non-volatile data storage to the computing system (102) in the form of data storage (170). Storage device adapters useful in computers configured for live partition mobility with physical I/O migration according to various embodiments include Integrated Drive Electronics ("IDE") adapters, Small Computing system Interface ("SCSI") adapters, and others as will occur to those of skill in the art. Non-volatile computer memory also may be implemented for as an optical disk drive, electrically erasable programmable read-only memory (so-called "EEPROM" or "Flash" memory (134)), RAM drives, and so on, as will occur to those of skill in the art.

The example computing system (102) may also include one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (102) may also include a video adapter (114), which may be an example of an I/O adapter specially designed for graphic output to a display device (180) such as a display screen or computer monitor. Video adapter (114) may be connected to processor (156) through a high speed video bus (164), bus adapter (158), and the front side bus (162), which may also be a high speed bus.

The example computing system (102) of FIG. 1 also includes several I/O adapters which may be implemented as SR-IOV adapters in the form of network adapters (124, 126, and 128). SR-IOV, Single-root I/O virtualization, is an extension to the PCI Express (PCIe) specification. SR-IOV allows a device, such as a network adapter, to separate access to its resources among various PCIe hardware functions. These functions consist of the following types: A PCIe Physical Function (PF) and a PCIe Virtual Function (VF). The PF advertises the device's SR-IOV capabilities. Each VF is associated with a device's PF. A VF shares one or more physical resources of the device, such as a memory and a network port, with the PF and other VFs on the device. From the perspective of a logical partition (116, 118) instantiated by a hypervisor (136), a VF appears as a fully functional physical PCIe adapter. In this way, a single physical adapter may be 'shared' amongst many logical partitions or multiple virtual functions may be instantiated for use by a single logical partition. Although referred to as a 'virtual' function, readers of skill in the art will recognize that a VF is in fact a physical channel that is not a resource virtualized entirely by the hypervisor.

Any of the example network adapters from among network adapters (124, 126, and 128) may be configured to support SR-IOV and provide multiple virtual functions, where each of the virtual functions may be mapped to a respective logical partition (116, 118). In this way, each of the logical partitions may independently use a physical network adapter that is being shared among different logical partitions. Such network adapters may also be configured for data communications with other computers or devices (not shown) and for data communications with a data communications network (100, 101). Such data communications may be carried out serially through RS-232 connections, through external buses such as a Universal Serial Bus ("USB"), through PCI and PCIe fabrics, through data communications networks such as IP data communications networks, and in other ways as will occur to those of skill in the art. Network adapters may implement the hardware level of data communications through which one computer sends data communications to another computer, directly or through a data communications network. Examples of communications adapters useful in computers configured for live partition mobility with physical I/O migration according to various embodiments include modems for wired dial-up communications, Ethernet (IEEE 802.3) adapters for wired data communications, and 802.11 adapters for wireless data communications.

The network adapters (124, 126, and 128) may further be configured for data communications with hosts (195) over a network (101) reachable through local area networks (LANs), such as LAN (100). The network adapters (124, 126, and 128) may further be configured for data communications with storage area networks (SANs), such as SAN (112), and for data communications with various storage devices (104), such as storage devices (106) and storage devices (108).

As mentioned above, the computing system (102) of FIG. 1 may be configured for live partition mobility with physical I/O migration. Consider, for example, that the logical partition (116) is to be transferred to one of the hosts (195), where the computing system (102) is referred to as a 'source system' and the host (195) to which the logical partition (116) is to be transferred is referred to as a 'target system.' The hypervisor (136) in the example of FIG. 1 may carry out live partition mobility in accordance with various embodiments of the present disclosure by: pausing the logical partition (116) on the source system, where the logical partition is mapped to an I/O ('input/output') adapter (126, for example) of the source system; copying, to the target system (195), configuration information describing the mapping of the logical partition (116) to the I/O adapter (126); and copying, to the target system, the logical partition (116) of the source system (102). The hypervisor (136), through communications with a hypervisor on the target system may direct the target system hypervisor to place an I/O adapter of the target system (195) into an error state; map the logical partition of the target system to the I/O adapter of the target system in dependence upon the configuration information; place the I/O adapter of the target system into an error recovery state; and resume the logical partition on the target system. When the logical partition resumes, the logical partition will enter error recovery of the I/O communications channel and will now connect to the I/O adapter of the target system rather than the source system. All of this can occur without any modification of I/O parameters in the logical partition itself. That is, from the perspective of the logical partition, at least with respect to the I/O communications settings, no change has occurred when transferred from the source to the target system.

While in this disclosure, various embodiments are described in the context of the SR-IOV standard and PCIe, such descriptions are intended to be illustrative, not limiting. Readers will recognize that failover of a virtual function exposed by an SR-IOV adapter of a computing system may be carried out utilizing other virtualization standards, or no standard at all.

The network adapters (124, 126, and 128) are for purposes of illustration, not for limitation. Other I/O adapters may be utilized in live partition mobility according to embodiments of the present invention. Similarly, data centers according to various embodiments may include additional servers, routers, other devices, and peer-to-peer architectures, not shown in the figures, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments may be implemented on a variety of hardware platforms in addition to those illustrated.

Figure 2:
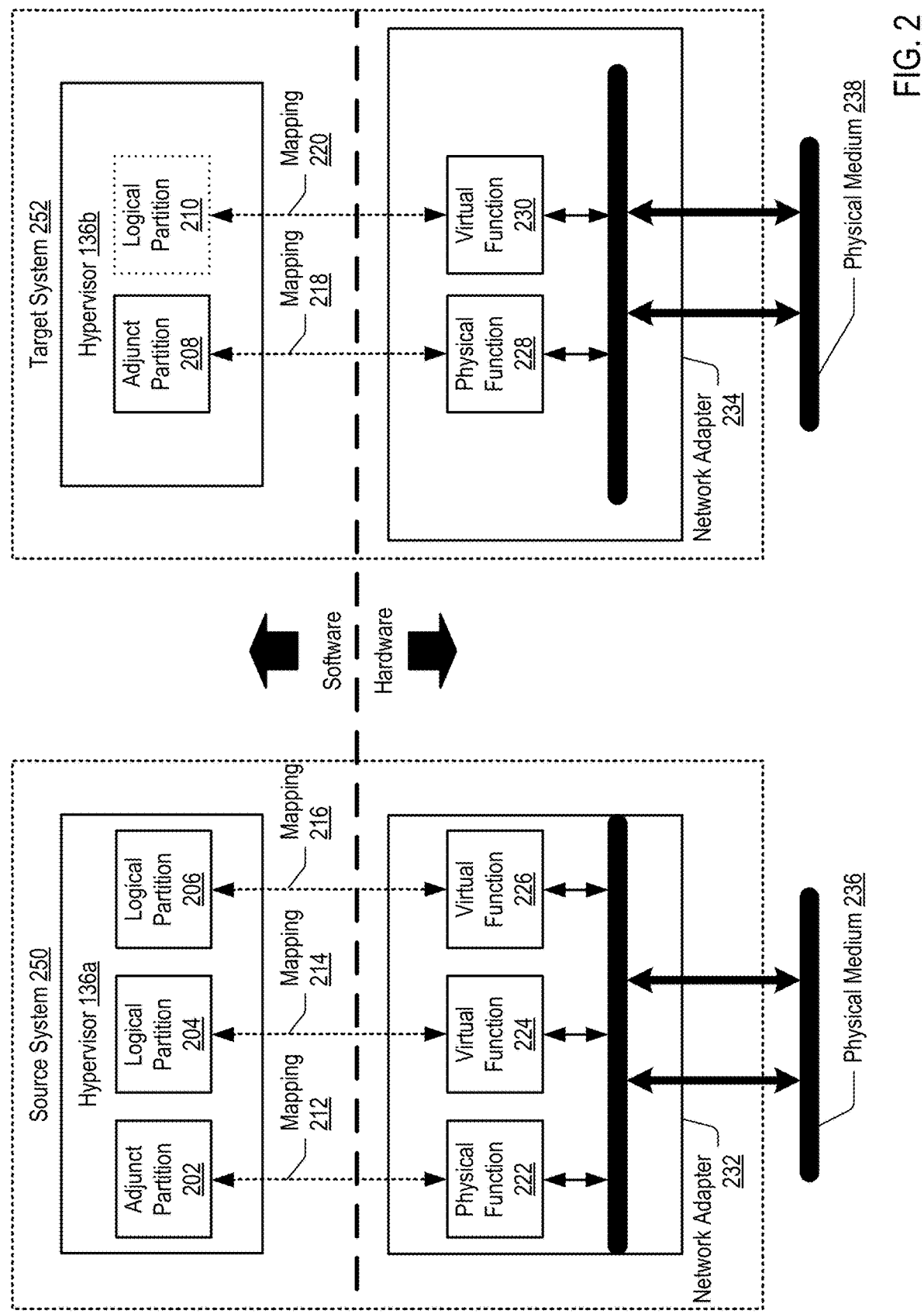
FIG. 2 sets forth an example system in which a logical partition of a source system is mapped to a virtual function exposed by an SR-IOV adapter and the system is configured for live partition mobility with I/O migration.

For further explanation, FIG. 2 sets forth an example system in which a logical partition of a source system is mapped to a virtual function exposed by an SR-IOV adapter and the system is configured for live partition mobility with I/O migration. The system of FIG. 2 includes a source system (250). The source system includes a hypervisor (136a) that is coupled for data communications over a physical medium (236) through one or more network adapters (232). The hypervisor (136a) of the source system (250) in the example of FIG. 2 supports execution of several logical partitions (204, 206) and an adjunct partition (202). Each logical partition (204, 206) is mapped (214, 216) to a respective virtual function (224, 226) exposed by the network adapter (232). The logical partitions (204, 206) in the example of FIG. 2 may be mapped (214, 216) to the virtual functions (224, 226) exposed by network adapter (232) with: information for identifying a PCIe slot for the network adapter for a virtual function; specifications of direct memory access (DMA) memory space; mappings for memory mapped input output (MMIO); and other configurations or settings that enable a given logical partition to communicate and use physical resources by interfacing with a given virtual function on a network adapter. Such mappings are generally maintained by the hypervisor (136a) and an adjunct partition (202).

An adjunct partition as the term is used in this specification refers to a partition instantiated by a hypervisor and configured for management of SR-IOV adapter resources, including various configuration parameters of virtual functions (224, 226) exposed by the network adapter (232). In some embodiments, for example, each adjunct partition (202) is associated and mapped (212) with a physical function (222) of a discrete network adapter (232). The adjunct partition may include, in addition to a kernel, a driver for managing a network adapter through a management channel specified in the protocol for the network adapter.

The example source system (250) of FIG. 2 may be configured for live partition mobility with I/O migration. The logical partition (204), for example, may be migrated to the target system (252) as logical partition (210). The target system (252) also executes a hypervisor (136b) and is coupled to a physical medium (238) via an SR-IOV network adapter (234). The hypervisor (136b) of the target system (252) supports execution of an adjunct partition (208) which is mapped (218) to the physical function (228) exposed by the network adapter (234).

To migrate the logical partition (204) from the source system to the target system utilizing live partition mobility with I/O migration, the hypervisor (136a) may pause execution of the logical partition (204), copy, to the target system, configuration information describing the mapping of the logical partition (204) to the I/O adapter (232), and copying, to the target system, the logical partition (204) of the source system. These steps need not occur in any particular order. For example, copying the logical partition (204) to the target system may be done asynchronously over time, page by page until a threshold number of pages has been copied.

The hypervisor (136a) may then direct the hypervisor (136b) to place an I/O adapter of the target system into an error state. An error state may include the 'EEH' (enhanced error handling) error state which is an extension to the PCI standard specification and enabled in systems running IBM's Power™ Processors. In embodiments in which the I/O adapter is an SR-IOV adapter and the logical partition migrated to the target system is to be mapped to a virtual function exposed by the SR-IOV adapter, placing the I/O adapter in the error state may include placing only the virtual function in the error state. Once the virtual function is placed in the error state, the hypervisor (136b) may map (220) the logical partition (210) of the target system to a virtual function (230) exposed by the I/O adapter (234) of the target system (252). Mapping the logical partition (210) to the virtual function (230) may include mapping direct memory access (DMA) memory space; MMIO space; mapping interrupts, and other configurations or settings that enable a given logical partition to communicate and use physical resources by interfacing with a given virtual function on a network adapter.

After mapping the logical partition (210) to the virtual function (230), the hypervisor (136b) may place the I/O adapter of the target system into an error recovery state and resume the logical partition on the target system. Once placed into the error recovery state and upon resuming execution of the logical partition, the logical partition (210) will reconnect to the virtual function (230) as if reestablishing communication with the virtual function (226) of the source system. That is, the logical partition (210), from the perspective of I/O functionality, has no knowledge that the logical partition is executing on a different system and coupled for I/O to a different adapter.

Figure 3:
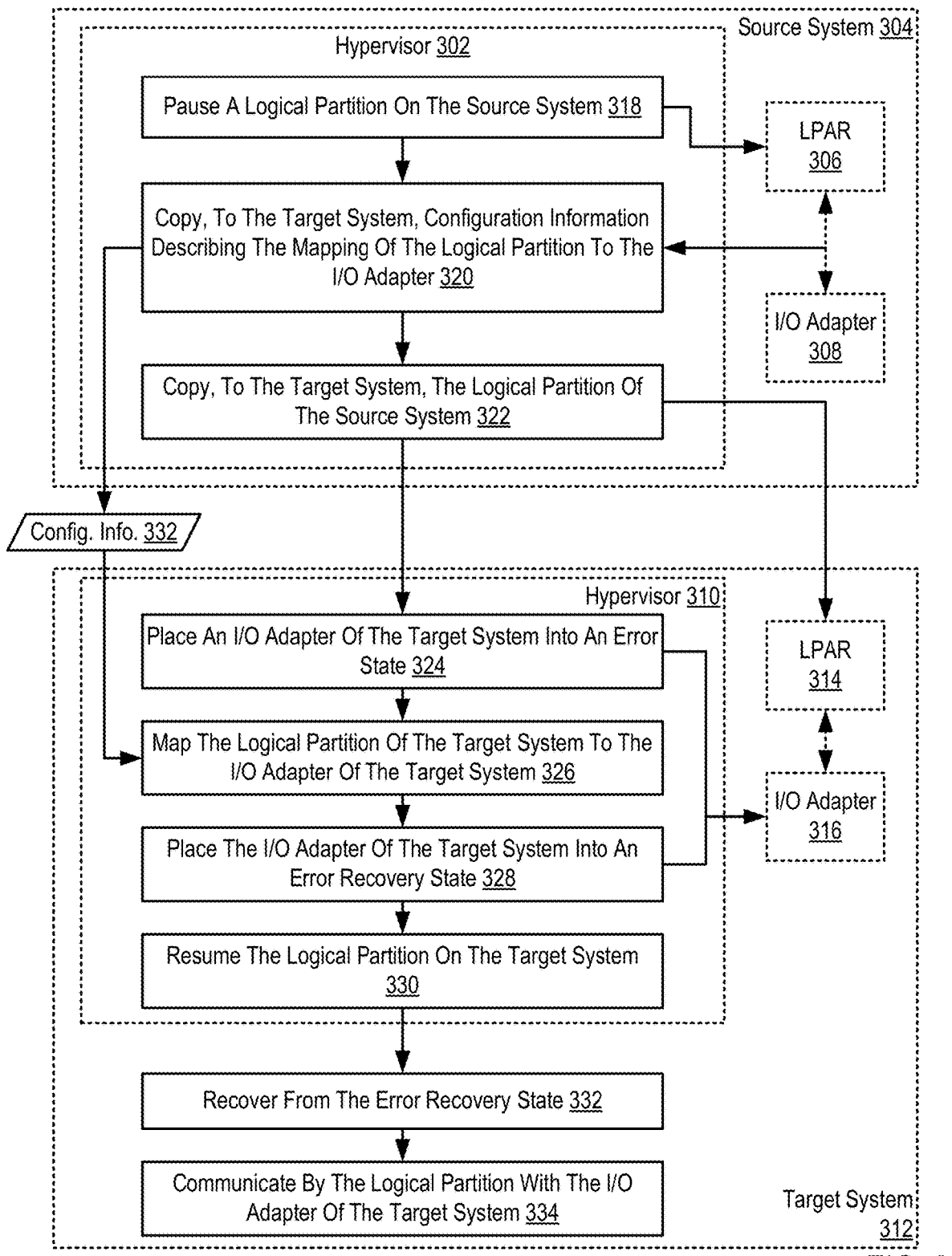
FIG. 3 sets forth a flow chart illustrating an exemplary method for live partition mobility with I/O migration according to embodiments of the present invention.

For further explanation, FIG. 3 sets forth a flow chart illustrating an exemplary method for live partition mobility with I/O migration according to embodiments of the present invention. The method of FIG. 3 may be carried out in a computing environment similar to that of FIG. 1 or FIG. 2 which includes a source system and a target system.

The method of FIG. 3 includes pausing (318) a logical partition (306) on the source system (304), where the logical partition (306) is mapped to an I/O adapter (308) of the source system (304). Pausing (318) a logical partition (306) on the source system (304) may be carried out by the hypervisor (302) of the source system through one or more interrupts.

The method of FIG. 3 also includes copying (320), to the target system (312), configuration information (332) describing the mapping of the logical partition (306) to the I/O adapter (308). Copying (320) configuration to the target system (304) may be carried out by collecting information from the I/O adapter of the source system and from the hypervisor including a capacity value of I/O adapter, a Media Access Control (MAC) address of the I/O adapter, permissions for the I/O adapter, virtual LAN (VLAN) information, and the like and providing the information to a hypervisor (310) of the target system.

The method of FIG. 3 also includes copying (322), to the target system (312), the logical partition (306) of the source system (304). Copying (322) the logical partition (306) to the target system, where it is instantiated as a logical partition (314), may be carried out by copying memory contents corresponding to the logical partition of the source system to the target system and creating a clone of the running partition. Dirty memory pages are recopied to the target system as necessary. When a particular threshold of memory pages has been copied the logical partition (314) on the target system (312) is ready to resume execution. After which, any additional memory pages related to the logical partition of the source system are copied over to the target system and incorporated into the logical partition execution there.

The method of FIG. 3 also includes placing (324) an I/O adapter of the target system into an error state. Placing (324) an I/O adapter of the target system into an error state may be carried out in a variety of ways including, for example, by generating an interrupt in the I/O adapter designated for such purpose.

The method of FIG. 3 also includes mapping (326), in dependence upon the configuration information (332), the logical partition (314) of the target system (312) to the I/O adapter (316) of the target system (312). Mapping (326) the logical partition (314) to the I/O adapter (316) may include mapping I/O-related interrupts to the I/O adapter and the logical partition, mapping MIMO space, mapping DMA space, mapping VLANs, and the like. Mapping (326) the logical partition of the target system to the I/O adapter of the target system may be carried out without modifying I/O parameters in the logical partition. Rather only modifications are made to mappings in the I/O adapter and hypervisor with respect to the logical partition.

The method of FIG. 3 also includes placing (328) the I/O adapter (316) of the target system (312) into an error recovery state and resuming (330) the logical partition on the target system. Placing (328) the I/O adapter of the target system into an error recovery state may be carried out in a variety of ways including, for example, by transmitting to the I/O adapter (316) an interrupt designated for such a purpose. In some other embodiments, the I/O adapter may be placed in the error recovery state with no direct involvement from the hypervisor. Rather, the hypervisor, in resuming the logical partition may indirectly place the I/O adapter in an error recovery state. That is, the I/O adapter may, once place into an error state immediately begin to attempt to recover from that error state. In such an embodiment, when the logical partition (314) is resumed on the target system (312), the I/O driver in the logical partition will detect a loss of communications on the I/O communications channel, enter the error state, and attempt to recover. In this way, the hypervisor, by resuming the logical partition (314), may place the I/O adapter in a state in which it is able to recover.

The method of FIG. 3 continues by recovering (332) from the error recovery state and communicating (334) by the logical partition (314) with the I/O adapter (316) of the target system (312). That is, once the logical partition and the I/O adapter reestablish communications on a physical I/O channel, through normal error recovery options, the logical partition (314) and I/O adapter (316) may communicate with one other through I/O operations. In this way, a logical partition having a physical I/O connection rather than purely virtual connections may be migrated from a source system to a target system with only a short interruption of I/O communications and no need to modify I/O parameters in the logical partition itself.

Figure 4:
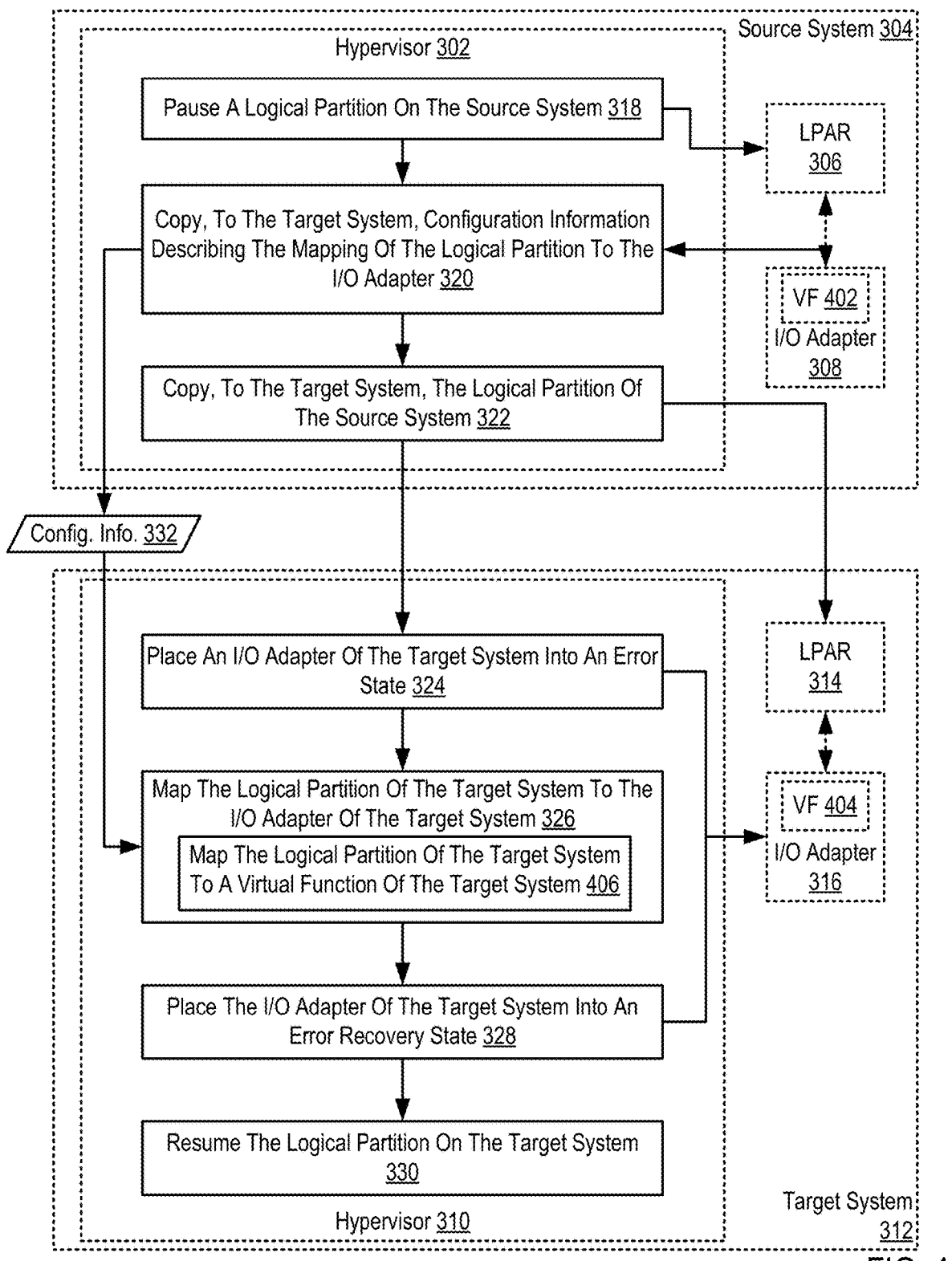
FIG. 4 sets forth a flow chart illustrating a further exemplary method for live partition mobility with I/O migration according to embodiments of the present invention.

For further explanation, FIG. 4 sets forth a flow chart illustrating a further exemplary method for live partition mobility with I/O migration according to embodiments of the present invention. The method of FIG. 4 is similar to the method of FIG. 3 including as it does: pausing (318) a logical partition on the source system; copying (320) I/O configuration information to the target system; copying (322) the logical partition to the target system; placing (324) an I/O adapter of the target system into an error state; mapping (326) the logical partition of the target system to the I/O adapter of the target system; placing (328) the I/O adapter of the target system into an error recovery state; and resuming (330) the logical partition on the target system.

The method of FIG. 4 differs from the method of FIG. 3, however, in that in the method of FIG. 4, the I/O adapter (308) of the source system is an SR-IOV adapter and the logical partition (306) of the source system is mapped to a virtual function (402) exposed by the SR-IOV adapter (308) of the source system (304). Moreover, in the method of FIG. 4, the I/O adapter (316) of the target system (312) is also an SR-IOV adapter.

In such an embodiment, mapping (326) the logical partition (314) of the target system (312) to the I/O adapter (316) of the target system is carried out by mapping (406) the logical partition (314) of the target system (312) to a virtual function (404) exposed by the SR-IOV adapter (316) of the target system (312). Mapping the logical partition to a virtual function may be carried out through an adjunct partition configured to manage the SR-IOV adapter (316) of the target system. The hypervisor may update various mappings for the virtual function (404) in the adjunct partition which includes an SR-IOV physical function driver. The SR-IOV physical function driver may also utilize the PF driver management channel of the physical function to configure the I/O adapter as necessary. Some configurations may include instantiating a new virtual function if a standby is not available, mapping MIMO space, DMA space, and so on.

Figure 5:
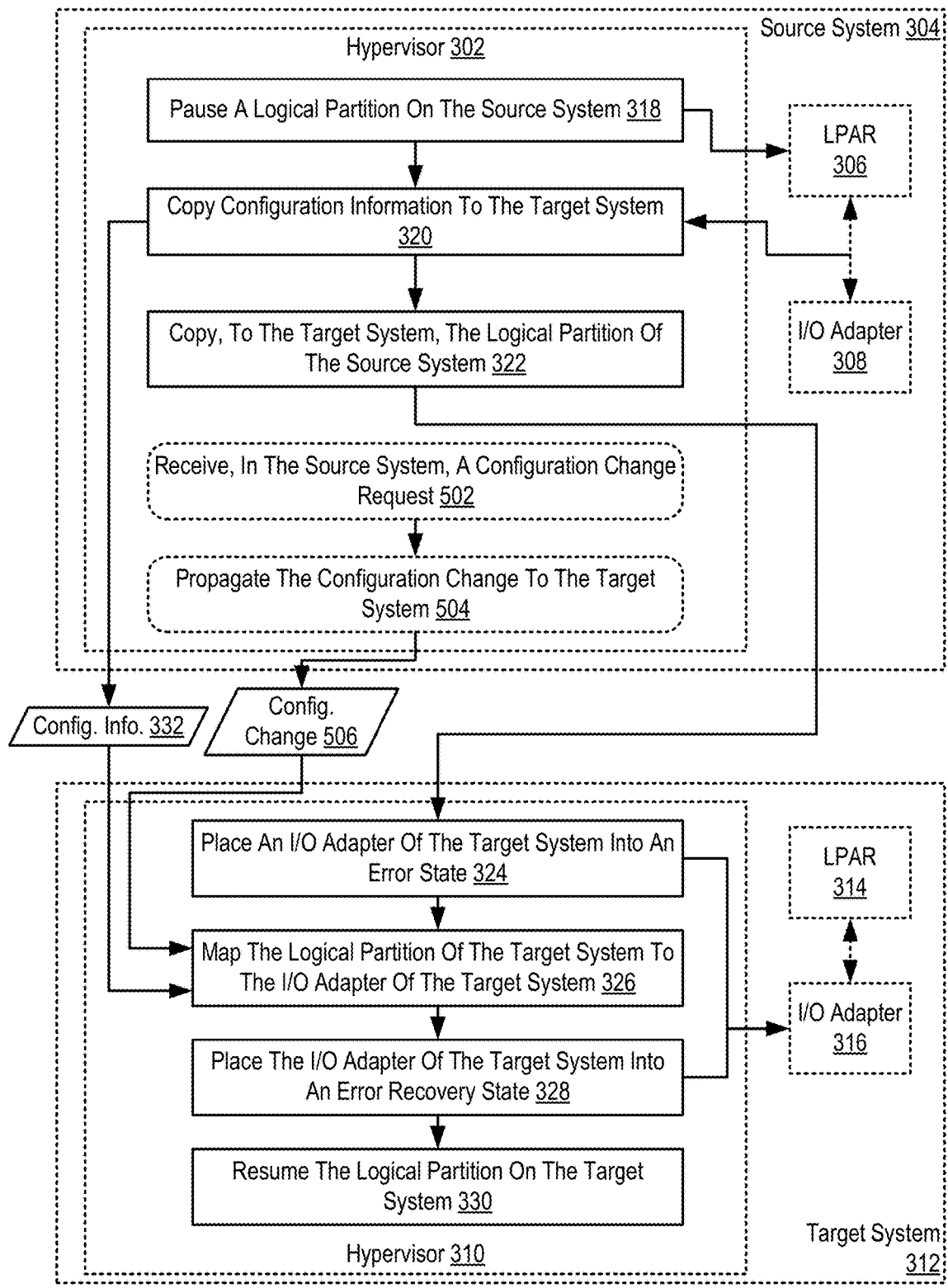
FIG. 5 sets forth a flow chart illustrating a further exemplary method for live partition mobility with I/O migration according to embodiments of the present invention.

For further explanation, FIG. 5 sets forth a flow chart illustrating a further exemplary method for live partition mobility with I/O migration according to embodiments of the present invention. The method of FIG. 5 is similar to the method of FIG. 3 including as it does: pausing (318) a logical partition on the source system; copying (320) I/O configuration information to the target system; copying (322) the logical partition to the target system; placing (324) an I/O adapter of the target system into an error state;

mapping (326) the logical partition of the target system to the I/O adapter of the target system; placing (328) the I/O adapter of the target system into an error recovery state; and resuming (330) the logical partition on the target system.

The method of FIG. 5 differs from the method of FIG. 3, however, in that in the method of FIG. 5, at some time prior to placing (328) the I/O adapter of the target system in the error recovery state, the hypervisor (302) of the source system (304) may receive (502), in the source system, a configuration change request (506) to the I/O adapter (308) of the source system. That is, prior to the logical partition and I/O adapter of the target system being fully operational, a user or management application may alter the configuration of the I/O adapter being migrated from the source to the target. To that end, the method of FIG. 5 includes propagating (504) the configuration change (332) to the target system (312).

Figure 6:
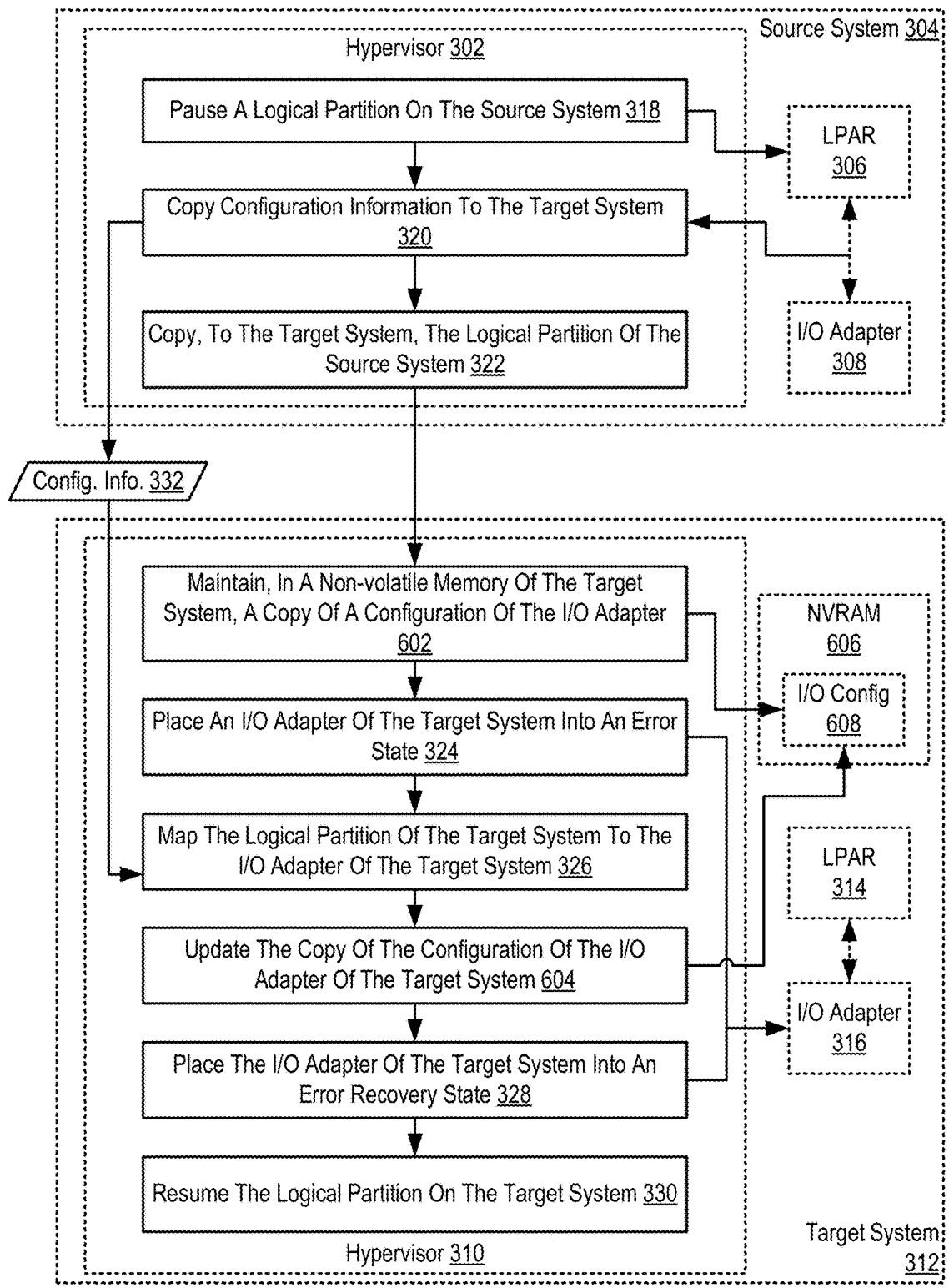
FIG. 6 sets forth a flow chart illustrating a further exemplary method for live partition mobility with I/O migration according to embodiments of the present invention.

For further explanation, FIG. 6 sets forth a flow chart illustrating a further exemplary method for live partition mobility with I/O migration according to embodiments of the present invention. The method of FIG. 6 is similar to the method of FIG. 3 including as it does: pausing (318) a logical partition on the source system; copying (320) I/O configuration information to the target system; copying (322) the logical partition to the target system; placing (324) an I/O adapter of the target system into an error state; mapping (326) the logical partition of the target system to the I/O adapter of the target system; placing (328) the I/O adapter of the target system into an error recovery state; and resuming (330) the logical partition on the target system.

The method of FIG. 6 differs from the method of FIG. 3, however, in that the method of FIG. 6 also includes maintaining (602), in a non-volatile memory (606) of the target system (312), a copy of a configuration (608) of the I/O adapter (316) of the target system (312). Such a copy may be stored for use when an error causes a reboot of the I/O adapter or the like.

As changes are made over time to the configuration of the I/O adapter, the copy (608) of the I/O configuration is updated to reflect those changes. As such, responsive to mapping (326) the logical partition (314) of the target system to the I/O adapter (316) of the target system (312), the method of FIG. 6 continues by updating (604) the copy (608) of the configuration of the I/O adapter of the target system. That is, the hypervisor may propagate any changes to the configuration of the I/O adapter, even prior to the I/O adapter operating in communication with the logical partition (314) to the backup copy (608) stored in non-volatile memory (606). In the example of FIG. 6, the non-volatile memory (606) is implemented, for example only, as a non-volatile RAM which may be a battery backed RAM module or modules.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of live partition mobility in a computing environment, the computing environment comprising a target system, the method comprising:
   instantiating a logical partition on the target system, wherein the logical partition was previously paused on a source system;
   placing a Single-root I/O virtualization (SR-IOV) adapter of the target system into an error state by placing a virtual function of the SR-IOV adapter of the target system into an error state;
   mapping, in dependence upon configuration information, the logical partition of the target system to a virtual function exposed by the SR-IOV adapter of the target system;
   placing the SR-IOV adapter of the target system into an error recovery state; and
   resuming the paused logical partition previously instantiated on the target system.

2. The method of claim 1 wherein mapping the logical partition of the target system to the virtual function exposed by the SR-IOV adapter of the target system further comprises:
   mapping interrupts for the virtual function and logical partition;
   mapping memory mapped I/O space for the virtual function and logical partition; and
   mapping direct memory access ('DMA') space for the virtual function and logical partition.

3. The method of claim 1, further comprising:
   recovering from the error recovery state; and
   communicating by the logical partition with the SR-IOV adapter of the target system.

4. The method of claim 1 further comprising:
   receiving, from the source system, a configuration change request to the SR-IOV adapter of the source system prior to placing the SR-IOV adapter of the target system in the error recovery state.

5. The method of claim 1 further comprising:
   maintaining, in a non-volatile memory of the target system, a copy of a configuration of the SR-IOV adapter of the target system; and
   responsive to mapping the logical partition of the target system to the virtual function exposed by the SR-IOV adapter of the target system, updating the copy of the configuration of the SR-IOV adapter of the target system.

6. The method of claim 1, wherein:
   mapping the logical partition of the target system to the virtual function exposed by the SR-IOV adapter of the target system further comprises mapping the logical partition of the target system to the virtual function exposed by the SR-IOV adapter of the target system without modifying I/O parameters in the logical partition.

7. An apparatus for live partition mobility in a computing environment, the computing environment comprising a source system and a target system, the apparatus comprising a computer processor, a computer memory operatively coupled to the computer processor, the computer memory having disposed within it computer program instructions that, when executed by the computer processor, cause the apparatus to carry out:
   instantiating a logical partition on the target system, wherein the logical partition was previously paused on a source system;
   placing a Single-root I/O virtualization (SR-IOV) adapter of the target system into an error state by placing a virtual function of the SR-IOV adapter of the target system into an error state;
   mapping, in dependence upon configuration information, the logical partition of the target system to a virtual function exposed by the SR-IOV adapter of the target system;
   placing the SR-IOV adapter of the target system into an error recovery state; and
   resuming the paused logical partition previously instantiated on the target system.

8. The apparatus of claim 7 wherein mapping the logical partition of the target system to the virtual function exposed by the SR-IOV adapter of the target system further comprises:
mapping interrupts for the virtual function and logical partition;
mapping memory mapped I/O space for the virtual function and logical partition; and
mapping direct memory access ('DMA') space for the virtual function and logical partition.

9. The apparatus of claim 7, further comprising computer program instructions that, when executed by the computer processor, cause the apparatus to carry out:
recovering from the error recovery state; and
communicating by the logical partition with the SR-IOV adapter of the target system.

10. The apparatus of claim 7 further comprising computer program instructions that, when executed by the computer processor, cause the apparatus to carry out:
receiving, from the source system, a configuration change request to the SR-IOV adapter of the source system prior to placing the SR-IOV adapter of the target system in the error recovery state.

11. The apparatus of claim 7 further comprising computer program instructions that, when executed by the computer processor, cause the apparatus to carry out:
maintaining, in a non-volatile memory of the target system, a copy of a configuration of the SR-IOV adapter of the target system; and
responsive to mapping the logical partition of the target system to the virtual function exposed by the SR-IOV adapter of the target system, updating the copy of the configuration of the SR-IOV adapter of the target system.

12. The apparatus of claim 7, wherein:
mapping the logical partition of the target system to the virtual function exposed by the SR-IOV adapter of the target system further comprises mapping the logical partition of the target system to the virtual function exposed by the SR-IOV adapter of the target system without modifying I/O parameters in the logical partition.

13. A computer program product for live partition mobility in a computing environment, the computing environment comprising a source system and a target system, the computer program product disposed upon a computer readable storage medium, wherein the computer readable storage medium is not a signal, the computer program product comprising computer program instructions that, when executed, cause a computer to carry out:
instantiating a logical partition on the target system, wherein the logical partition was previously paused on a source system;
placing a Single-root I/O virtualization (SR-IOV) adapter of the target system into an error state by placing a virtual function of the SR-IOV adapter of the target system into an error state;
mapping, in dependence upon configuration information, the logical partition of the target system to a virtual function exposed by the SR-IOV adapter of the target system;
placing the SR-IOV adapter of the target system into an error recovery state; and
resuming the paused logical partition previously instantiated on the target system.

14. The computer program product of claim 13 wherein mapping the logical partition of the target system to the virtual function exposed by the SR-IOV adapter of the target system further comprises:
mapping interrupts for the virtual function and logical partition;
mapping memory mapped I/O space for the virtual function and logical partition; and
mapping direct memory access ('DMA') space for the virtual function and logical partition.

15. The computer program product of claim 13, further comprising computer program instructions that, when executed, cause a computer to carry out:
recovering from the error recovery state; and
communicating by the logical partition with the SR-IOV adapter of the target system.

16. The computer program product of claim 13 further comprising computer program instructions that, when executed, cause a computer to carry out:
receiving, from the source system, a configuration change request to the SR-IOV adapter of the source system prior to placing the SR-IOV adapter of the target system in the error recovery state.

17. The computer program product of claim 13 further comprising computer program instructions that, when executed, cause a computer to carry out:
maintaining, in a non-volatile memory of the target system, a copy of a configuration of the SR-IOV adapter of the target system; and
responsive to mapping the logical partition of the target system to the virtual function exposed by the SR-IOV adapter of the target system, updating the copy of the configuration of the SR-IOV adapter of the target system.

* * * * *